(No Model.)

E. H. AMET.
DEVICE FOR HOLDING CORDS OR LINES.

No. 413,882. Patented Oct. 29, 1889.

Witnesses:
Sew. E. Curtis.
Mack A. Claflin.

Inventor:
Edward H. Amet
By Munday Evarts & Adcock
his Attorneys.

UNITED STATES PATENT OFFICE.

EDWARD H. AMET, OF CHICAGO, ILLINOIS, ASSIGNOR TO HIMSELF AND HERBERT A. STREETER, OF SAME PLACE.

DEVICE FOR HOLDING CORDS OR LINES.

SPECIFICATION forming part of Letters Patent No. 413,882, dated October 29, 1889.

Application filed March 11, 1889. Serial No. 302,856. (No model.)

*To all whom it may concern:*

Be it known that I, EDWARD H. AMET, a citizen of the United States, residing in Chicago, in the county of Cook and State of Illinois, have invented a new and useful Improvement in Devices for Holding Cords or Lines, of which the following is a specification.

My invention relates to devices for holding cords or lines.

It consists in the novel devices and novel combinations of devices herein shown and described, and more particularly pointed out in the claim.

Figure 1:
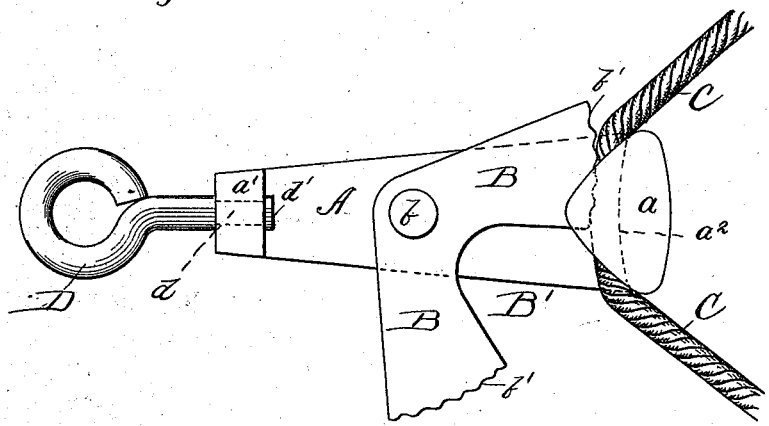
Figure 2:
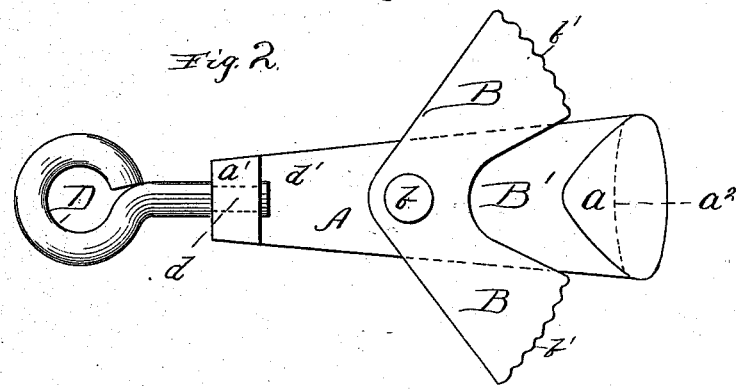
Figure 3:
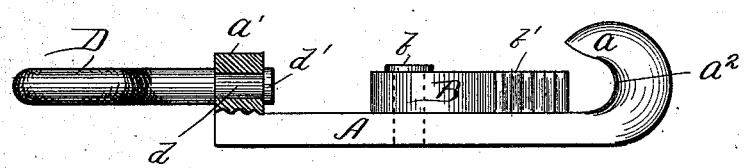

In the accompanying drawings, which form a part of this specification, and in which similar letters of reference indicate like parts, Figure 1 is a plan view of a device embodying my invention. Fig. 2 is a similar view showing the double-wing clamping-pawl in position for inserting the rope, and Fig. 3 is a side elevation.

In said drawings, A represents the clamp-hook bar or plate furnished with a hook or clamping projection $a$ at one end and a right-angle projection or bend $a'$ at the other end. The bearing or clamping surface $a^2$ of the hook $a$ is rounded, as indicated in the drawings, so as to prevent injury to the rope by sharp corners or bends. The double-wing eccentric clamping-pawl B B is pivoted by a rivet $b$ to the flat bar A, near the middle thereof. The clamping-surface of each wing of the pawl is furnished with wavy serrations $b'$ $b'$, so as to firmly clamp the rope C without injuring it. The open space $B'$ between the two wings B B of the pawl permits the easy insertion of the rope in the hook $a$.

D is a swivel-ring having a shank $d$, which fits in a suitable hole in the shank or bent portion $a'$ of the clamp-bar A, so that the clamp-bar A may freely turn or swivel on the ring D.

The swivel-ring D may be connected or secured to any desired support in any suitable way. The shank $d$ is furnished with a head $d'$, preferably formed by riveting or upsetting.

I claim—

The combination, in a line or rope holder, of clamp-bar A, having hook $a$, with double-wing eccentric clamping-pawl B B, pivoted to said bar A, and swivel-ring D, having shank $d$ extending through a projection $a'$, with which said bar A is provided, substantially as specified.

EDWARD H. AMET.

Witnesses:
H. M. MUNDAY,
EDW. S. EVARTS.